E. WESTON.

ELECTRICAL MEASURING INSTRUMENT.

No. 11,250. Reissued June 28, 1892.

WITNESSES:

Gustave Dieterich

M. Posch

INVENTOR

Edward Weston

BY Park Benjamin his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Reissued Letters Patent No. 11,250, dated June 28, 1892.

Original No. 433,637, dated August 5, 1890. Application for reissue filed February 5, 1892. Serial No. 420,481.

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an electrical measuring-instrument intended chiefly for use as an electro-dynamometer for the measurement of alternating currents of electricity.

My invention consists, broadly, in a fixed or stationary coil and a coil oscillating or vibrating on inclosed pivots in the field of force of said stationary coil, said coils being electrically connected. The vibrating coil on the passage of the current through the circuit, including both coils, assumes an angular position, depending upon the difference of potential between the terminals of the circuit. The reversals of the current in both coils occur simultaneously, and hence an index or pointer connected to the movable coil is always deflected in the same direction, thus indicating the extent of said angular movement upon a suitable scale.

My invention further consists in the construction and arrangement of the instrument, as hereinafter more particularly pointed out.

Figure 1:
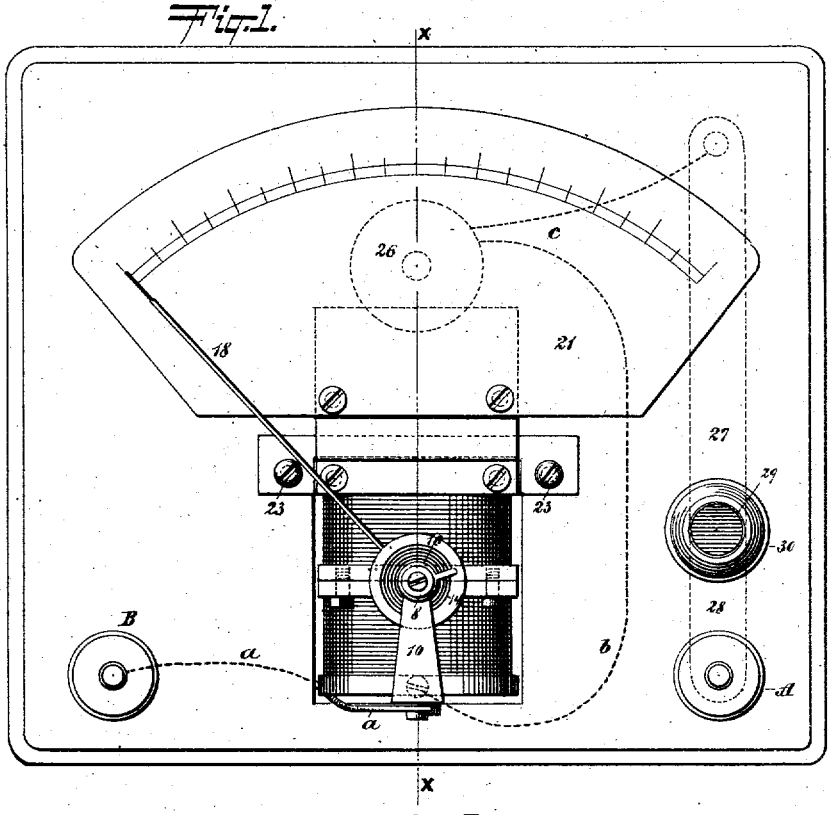
Figure 2:
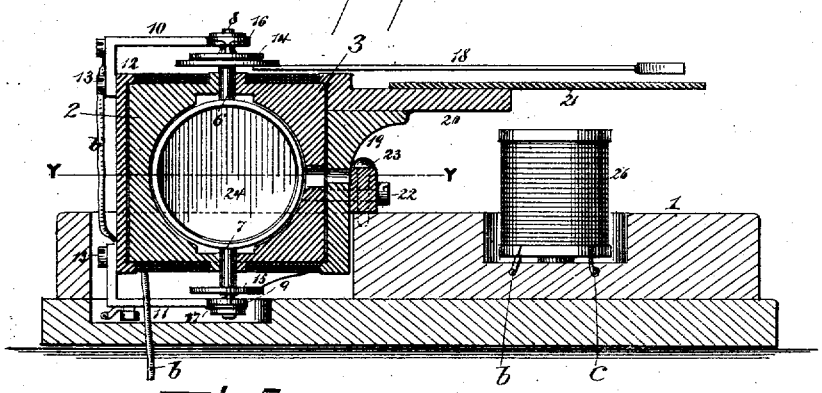
Figure 3:
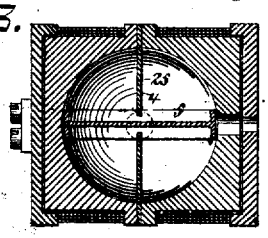

In the accompanying drawings, Figure 1 is a plan view; Fig. 2, a section on the line X X of Fig. 1; and Fig. 3, a section on the line Y Y, Fig. 2.

Similar letters and numbers of reference indicate like parts.

1 is the base of the instrument, suitably recessed to receive the two bobbins or spools 2 and 3, which are placed end to end and surrounded by coils of fine insulated wire connected in series. The bodies of the spools 2 and 3 are made of rubber or other insulating material, and they are hollowed out to form a spherical cavity 4, Fig. 3.

5 is a circular frame, of insulating material—such as shellacked paper—on which is wound a coil of fine wire, the terminals of which are connected to the pivot-pins 6 and 7, which pins are secured to said frame. The said pins are therefore journaled in the bodies of the spools 2 and 3, and have their bearings in adjustable steps 8 and 9, which are supported upon the metal arms 10 and 11. The arms 10 and 11 are secured to an outer cover 12, which extends over the outer face of the spool 2 by means of screws 13. Surrounding the pivot-pins 6 and 7 are spiral springs 14 and 15, the inner ends of said springs being connected to said pivot-pins and the outer ends of said springs being connected to arms 16 and 17, which are pivoted at the extremities of said arms 10 and 11. By turning the arms 16 and 17 on their pivots the springs 14 and 15 may be contracted or expanded. Supported on the upper pivot-pin is a light metallic disk, which carries an indicating-needle 18. The covering-plate 19 on the face of spool 3 carries a horizontal plate 20, to which is secured a scale-plate 21; also to the plate 19 is fastened by screws 22 a cross-piece, and through this cross-piece extend screws 23, which enter the base 1. By removing these screws 23 the spools 2 and 3 and associated parts can be separated from the base.

Within the ring 5 and filling the space included in it is a sheet of mica 24. This sheet passes through an opening in a diaphragm 25 of rubber or other non-conducting material, which is held between the spools 2 and 3 and extends diametrically across the spherical opening or chamber 4.

26 is an ordinary resistance-coil supported in a recess on the base in any suitable manner.

27 and 28 (dotted lines) are two contact-springs, the spring 28 being in electrical contact with the binding-post A.

29 is a push-button passing through a sleeve 30, which surrounds an opening in the base-plate 1, which button when depressed moves the springs 27 and 28 into contact, and so closes the circuit.

The circuit in the instrument proceeds as follows: From the binding-post B by wire *a* to one of the terminals of the coils on the spools 2 and 3 and through said coils, the other terminal of which is connected to the lower spring 15. The current then passes by the pivot 7 to and through the movable coil on the frame 5 and thence to the pivot 6, to spring 14, to arm 16, to upper bracket 10, thence by the wire *b* through the resistance-coil 26 to the contact-plate 27 by wire *c* to contact-plate 28, and so to binding-post A.

It is intended to use this instrument to measure the electro-motive force of alternating currents, or, in other words, as the several coils are all connected in series and as the resistance-coil 26 is made of high resistance, to measure the difference of potential between the binding-posts A and B. Inasmuch as the movable coil supported within the fixed coil on the spools 2 and 3 is connected in circuit with the latter it follows that a reversal of the current in one coil will occur simultaneously with the reversal of the current in the other, and hence the needle will always be deflected in the same direction, regardless of the alternations of the current. Of course the normal or zero position of the frame 5 when no current is passing through the instrument is in a plane passing through the longitudinal axis of the coils on the spools 2 and 3, as shown in the drawings, Figs. 2 and 3, and the needle is adjusted so as to mark "zero" on the scale when the movable coil is in this position. The object of the mica diaphragm 24 is to deaden the vibrations of the coil upon the frame 5 through its action as a fan, and this effect is increased by the presence of the diaphragm 25, between which and the movable diaphragm 24 the air becomes somewhat compressed during the movement of the frame, and hence offers still greater resistance to the motion of the latter.

While I here show the spools or bobbins provided with an interior spherical chamber and diaphragm 25 and the frame or ring 5 provided with the diaphragm 24, it is to be understood that said spools or bobbins may be in the form of hollow cylinders and the diaphragms may be omitted, the said construction not being in anywise essential.

By the term "non-inductive material" herein applied to the spool or bobbin I mean a spool or bobbin constructed of any material or combination of materials in which induced currents will practically not be produced.

I have already stated that the coils in the instrument are to be made of fine wire. It is also to be understood that the movable coil is to be as light as possible and that the bearings of its pivot-shaft are to be jeweled; or, in other words, the said coil is to be so supported that it will move with the minimum of friction and to be so constructed that it will offer the least possible inertia to the actuating force of the current. By this structural arrangement I am enabled to move the coil to a definite position with a current of exceedingly low strength, and I am therefore enabled to reduce the effect of self-induction in the coils to such an extent that said effect becomes practically inappreciable and does not interfere to any practical amount with the sensitiveness and accuracy of the apparatus. By reducing the size of the conductor in the coils, reducing the weight and inertia of the movable coil supporting said coil so as to move with the minimum of friction, and by using springs of smallest possible force to control the coil I accomplish the important result of practically obviating self-induction. This result I believe to be wholly new in the art.

I desire next to direct particular attention to the springs 14 and 15. The arrangement of these springs is obviously such as to enable them to oppose their resiliency to the rotary movement of the pivot-shaft uniformly at every point of its movement—that is to say, there is no tendency on the part of either spring to draw or push the pivot against one side or other of its bearing, and consequently no irregular wear of either pivot or bearing ensues. In this way the accuracy of the instrument is not only enhanced, but conserved.

The relation of the springs 14 and 15 to the coils is of especial importance. It will be manifest that when the current traverses both coils I have here two fields mutually reacting upon one another and both variable. The movement of the pivoted coil will necessarily be due to this reaction of the two fields, but the extent of its movement in arc will not be necessarily proportional to the difference in potential between the terminals of the instrument, but will simply bear some relation to said potential difference. For, plainly, instead of the position of the movable coil being due to the reaction of a variable field upon a definite constant and fixed field, such as might be produced by a permanent magnet, in which case the reacting force would act in substantially the same way for all positions of the coil, its position is due to the reaction of two variable fields, when the reacting force acts in practically a different way for different positions of the coil and the resultant position of the coil corresponding to any given electro-motive force of current does not follow any one definite known law true for all positions.

In my present device, and so far as I know for the first time in the art, I cause the index of the instrument to move directly to the scale-mark, which is to be read as the indication and there remain, no bringing back to a zero-reading being necessary; and also, as I believe for the first time in the art, I have accomplished this in an instrument where the moving body is, as and for the reasons already pointed out, controlled by two reacting variable fields—namely, the varying field about the moving coil reacting upon the varying field about the fixed coil. I have discovered that I can balance a coil of fine wire thus actuated against an exceedingly delicate coiled spring or springs, so that the said springs will permit the coil, and hence the index moved by said coil, to move at once to a new position dependent upon the difference in potential between the instrument terminals, and the said springs may be constructed as to strength and elasticity and regulated by the means herein described, so that the indications of the instrument on direct reading will be accurate for all positions of the said movable coil.

The advantage of the use of two coiled springs, from what has been said, will be apparent. They act as conductors for the current into and out of the coil, obviating the necessity of mercury-cups or other form of joint which might offer resistance to the current and introduce friction, hence become oxidized or worn, and hence become a source of error in the instrument. So, also, the instrument having two springs takes the best portable form, and may be used in any position, which obviously could not be done if mercury-cups were employed.

I claim—

1. In an electrical measuring-instrument, a stationary coil, a coil movable in the field of said stationary coil, and a spring opposing and counterbalancing the impressed action of said movable coil, the said coils and spring being connected in circuit.

2. In an electrical measuring-instrument, a stationary coil, a coil pivoted and vibrating in the field of said stationary coil, and a spring opposing and counterbalancing the impressed action of said movable coil, the said coils and spring being in circuit.

3. In an electrical measuring-instrument, a stationary coil, a coil movable in the field of said stationary coil, and two springs opposing and counterbalancing the impressed action of said movable coil, the said coils and springs being in circuit and the said springs being disposed, respectively, to lead the actuating-current into and out of said movable coil.

4. In an electrical measuring-instrument, a fixed coil, a movable coil in the field of said fixed coil, an index showing the extent of movement of said movable coil, and a spring opposing and counterbalancing the movement of said movable coil and in circuit therewith, the said elements being constructed and arranged so that said index will be moved directly to show the extent of motion of said movable coil and by the counterbalancing effect of said spring be maintained in such position.

5. In an electrical measuring-instrument, a fixed coil, a movable coil in the field of said fixed coil, an index controlled by said movable coil, a scale graduated in definite electrical units, and a spring opposing and counterbalancing the movement of said movable coil and in circuit therewith, the said elements being constructed and arranged so that by the actuating-current said index will be moved directly to give a definite reading on said scale and be maintained at such reading by the counterbalancing effect of said spring.

6. In an electrical measuring-instrument, the combination of a movable conductor actuated by the current to be measured in a field of force maintained by the said current, and a means of indicating the extent of movement of said conductor, the said conductor being constructed to offer such electrical resistance and of such light weight and so freely movable as that the error due to the disturbing effect of self-induction of the actuating-current in said conductor shall bear an infinitesimal ratio to the actual indication and be practically *nil*.

7. In an electrical measuring-instrument, a stationary coil and a coil oscillating or vibrating on inclosed pivots in the field of force of said stationary coil, said coils being electrically connected.

8. In an electrical measuring-instrument, a stationary coil, a coil vibrating or oscillating on inclosed pivots in the field of force of said stationary coil, and a coiled spring connected to a coil-pivot and to an abutment and opposing the motion of said movable coil, said coils being electrically connected.

9. In an electrical measuring-instrument, a stationary coil, a coil supported on diametral inclosed pivots and vibrating or oscillating in the field of force of said stationary coil, a coiled spring concentric with the axis of rotation of said vibrating coil having one end connected to said coil and the other end to an abutment, and means for varying the resiliency of said spring, said coils being electrically connected.

10. In an electrical measuring-instrument, a stationary coil, a coil vibrating or oscillating in the field of force of said stationary coil, and a spring of conducting material opposing the movement of said vibrating coil, the said coils and spring being electrically connected.

11. In an electrical measuring-instrument, a spool or bobbin having an interior chamber, a coil surrounding said spool, a coil supported within said chamber on diametrally-disposed pivots extending through opposite sides of said spool, supports outside of said spool receiving said pivots, and a coiled spring connected at one end to one of said pivots outside of said spool and at the other end to a fixed abutment, the said coils being electrically connected.

12. In an electrical measuring instrument, a stationary coil, a coil vibrating or oscillating in the field of force of said stationary coil, two coiled springs of conducting material combined with said movable coil, and circuit connections, whereby said springs and movable coil are connected in circuit.

13. In an electrical measuring-instrument, a stationary coil, a coil vibrating or oscillating in the field of force of said stationary coil, two springs of conducting material connected, respectively, to the coil-pivots and to abutments, and circuit connections whereby the current is led first through one spring, then through the coil, and then through the other spring.

14. In an electrical measuring-instrument, the combination of the spool or bobbin of non-inductive material, a coil surrounding said spool, a coil supported within said spool on diametral pivots 6 and 7, arms or brackets 10 and 11 outside of said spool and receiving said pivots, spiral springs 14 and 15, surrounding said pins 6 and 7, and arms 16 and 17, pivoted at the extremities of said arms 10 11, the said springs being connected, respectively, at one end to said pivots 6 and 7 and at the other end to arms 16 and 17, and the said springs and coils being electrically connected in circuit.

15. In an electrical measuring-instrument, the combination of a spool or bobbin of non-inductive material, a coil surrounding said spool, a coil supported within said spool on diametral pivots 6 and 7, arms or brackets 10 and 11 outside of said spool and receiving said pivots, spiral springs 14 and 15, surrounding said pins 6 and 7, and arms 16 and 17, pivoted at the extremities of said arms 10 11, the said springs being connected, respectively, at one end to said pivots 6 and 7 and at the other end to arms 16 and 17, and a resistance-coil H, the said stationary coil, movable coil, springs, and resistance-coil being connected in series.

EDWARD WESTON.

Witnesses:

M. BOSCH,

H. R. MOLLER.